(12) United States Patent
Plante et al.

(10) Patent No.: US 11,668,245 B2
(45) Date of Patent: Jun. 6, 2023

(54) GAS TURBINE ENGINE WITH CLUTCH SYSTEM BETWEEN LOW-PRESSURE COMPRESSOR AND LOW-PRESSURE TURBINE

(71) Applicant: PRATT & WHITNEY CANADA CORP., Longueuil (CA)

(72) Inventors: Ghislain Plante, Verdun (CA); Patrick Valois, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 419 days.

(21) Appl. No.: 16/774,221

(22) Filed: Jan. 28, 2020

(65) Prior Publication Data

US 2021/0231058 A1 Jul. 29, 2021

(51) Int. Cl.
*F02C 7/36* (2006.01)
*F02C 7/32* (2006.01)
*F02C 3/107* (2006.01)
*F02C 7/268* (2006.01)

(52) U.S. Cl.
CPC .............. *F02C 7/36* (2013.01); *F02C 7/32* (2013.01); *F02C 3/107* (2013.01); *F02C 7/268* (2013.01); *F05B 2220/706* (2013.01); *F05D 2220/323* (2013.01); *F05D 2220/329* (2013.01); *F05D 2230/72* (2013.01); *F05D 2240/60* (2013.01); *F05D 2260/4031* (2013.01); *F05D 2270/304* (2013.01)

(58) Field of Classification Search
CPC .................................. F02C 7/36; F02C 3/113
See application file for complete search history.

(56) References Cited

U.S. PATENT DOCUMENTS

| 2,619,797 A | 12/1952 | Haworth |
| 6,865,891 B2 * | 3/2005 | Walsh ............... F02C 3/305 |
| | | 60/726 |
| 8,461,704 B2 | 6/2013 | McLoughlin et al. |

(Continued)

FOREIGN PATENT DOCUMENTS

| EP | 3354876 A1 | 8/2018 |
| GB | 711789 A | 7/1954 |

OTHER PUBLICATIONS

European Search Report issued in counterpart EP application No. 21153424 dated Jun. 4, 2021.

*Primary Examiner* — Stephanie Sebasco Cheng
(74) *Attorney, Agent, or Firm* — Norton Rose Fulbright Canada LLP.

(57) ABSTRACT

A gas turbine engine having: an engine core having, in serial flow communication, a low-pressure compressor, a high-pressure compressor, a high-pressure turbine drivingly connected to the high-pressure compressor, and a low-pressure turbine drivingly connected to an output shaft; and a clutch having a disengaged configuration in which the low-pressure turbine is drivingly disconnected from the low-pressure compressor such that, in the disengaged configuration, the clutch disengages the low-pressure turbine from the low-pressure compressor, and an engaged configuration in which the low-pressure turbine is drivingly connected to the low-pressure compressor, the low-pressure turbine drivingly connected to the output shaft in both of the engaged and disengaged configurations of the clutch.

13 Claims, 1 Drawing Sheet

(56) References Cited

U.S. PATENT DOCUMENTS

| | | | |
|---|---|---|---|
| 8,979,705 B2* | 3/2015 | Galivel | F01D 15/10 |
| | | | 477/30 |
| 10,393,027 B2 | 8/2019 | Lefebvre | |
| 10,450,959 B2* | 10/2019 | Morreale | F01D 25/20 |
| 2010/0154383 A1 | 6/2010 | Ress, Jr. | |
| 2015/0377142 A1* | 12/2015 | Sheridan | F02C 7/275 |
| | | | 60/778 |
| 2017/0321601 A1 | 11/2017 | Lafargue | |
| 2018/0216525 A1* | 8/2018 | Plante | B64D 27/10 |
| 2018/0223740 A1* | 8/2018 | Forest | F02C 7/268 |

\* cited by examiner

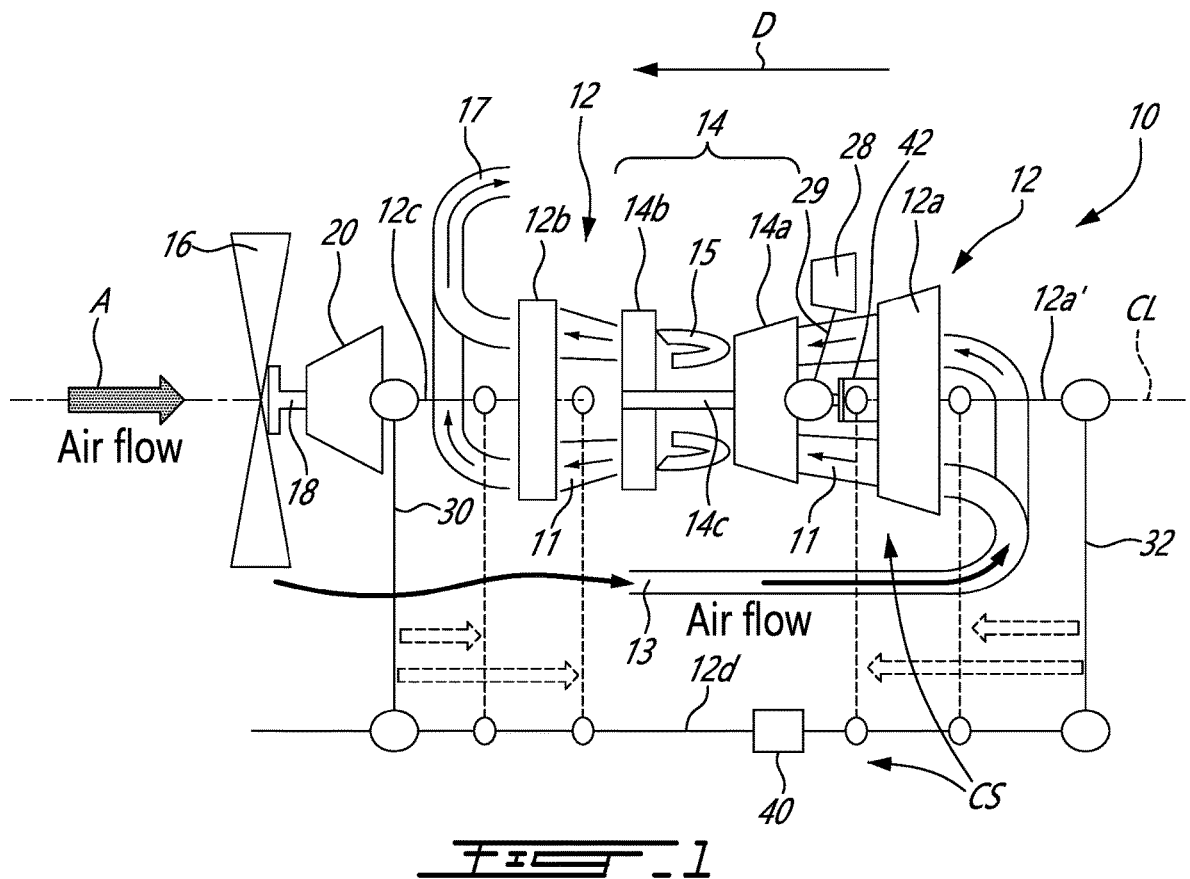
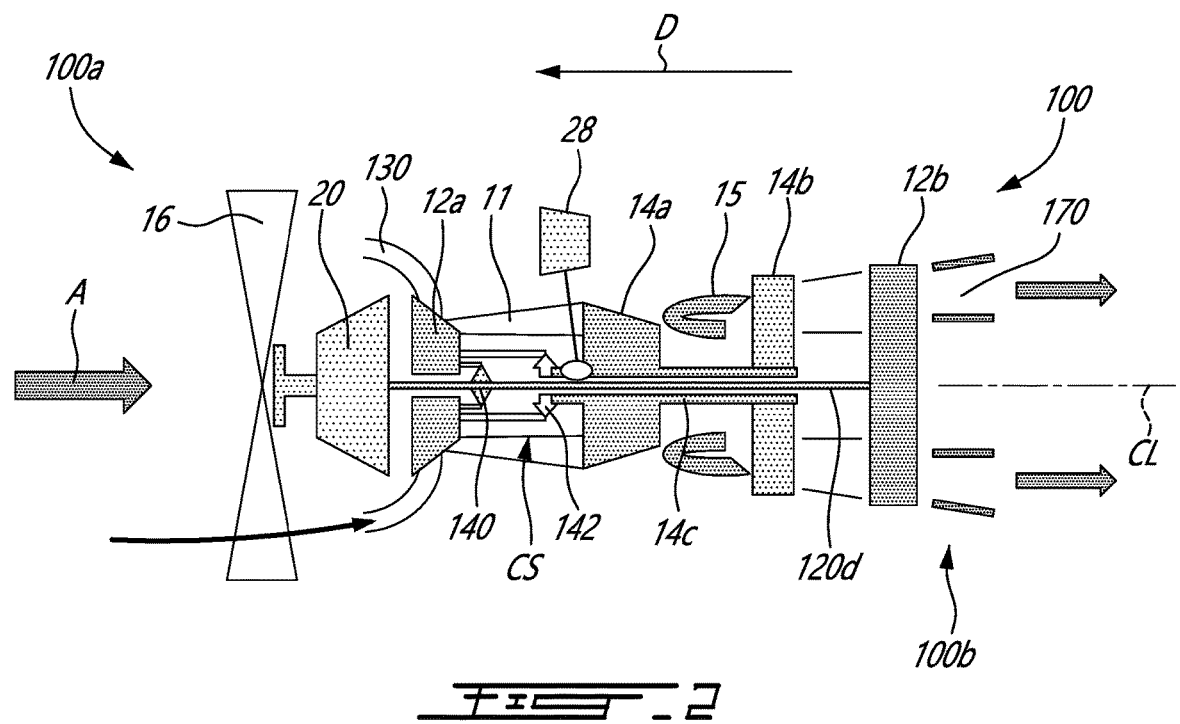

GAS TURBINE ENGINE WITH CLUTCH SYSTEM BETWEEN LOW-PRESSURE COMPRESSOR AND LOW-PRESSURE TURBINE

TECHNICAL FIELD

The application relates generally to gas turbine engines and, more particularly, to a multi-spool engine architecture.

BACKGROUND OF THE ART

Many gas turbine engine architectures with multiple stages have a low pressure compressor, high pressure compressor, high pressure turbine and low pressure turbine arranged sequentially in this order along the engine axial direction. The low pressure compressor at a first end of the engine is drivingly connected to the low pressure turbine at the opposed end of the engine via a low pressure shaft extending concentrically through a hollow high pressure shaft, which, in turn, drivingly connects the high pressure turbine to the high pressure compressor.

SUMMARY

In one aspect, there is provided a gas turbine engine comprising: an engine core having, in serial flow communication, a low-pressure compressor, a high-pressure compressor, a high-pressure turbine drivingly connected to the high-pressure compressor, and a low-pressure turbine drivingly connected to an output shaft; and a clutch having a disengaged configuration in which the low-pressure turbine is drivingly disconnected from the low-pressure compressor such that, in the disengaged configuration, the clutch disengages the low-pressure turbine from the low-pressure compressor, and an engaged configuration in which the low-pressure turbine is drivingly connected to the low-pressure compressor, the low-pressure turbine drivingly connected to the output shaft in both of the engaged and disengaged configurations of the clutch.

In another aspect, there is provided a gas turbine engine comprising: an engine core having, in serial flow communication, a low-pressure compressor, a high-pressure compressor, a high-pressure turbine drivingly connected the high-pressure compressor, and a low-pressure turbine drivingly connected to an output shaft; a system for selectively engaging the low-pressure compressor to one or both of the high-pressure compressor and the low-pressure turbine.

In yet another aspect, there is provided a method for a gas turbine engine having a low-pressure compressor, a high-pressure compressor, a high-pressure turbine drivingly engaging the high-pressure compressor, and a low-pressure turbine drivingly connected to an output shaft, comprising: receiving a power request; setting the gas turbine engine in a free-turbine configuration by disengaging the low-pressure compressor from the low-pressure turbine if the power request is below a power threshold while keeping the low-pressure turbine drivingly connected to the output shaft; setting the gas turbine engine in a boosted configuration by engaging the low-pressure compressor to the low-pressure turbine if the power request is above the power threshold while keeping the low-pressure turbine drivingly connected to the output shaft.

DESCRIPTION OF THE DRAWINGS

Reference is now made to the accompanying figures in which:

FIG. 1 is a schematic cross-sectional view of a reverse flow gas turbine engine in accordance with one embodiment; and FIG. 2 is a schematic cross-sectional view of a through flow engine in accordance with one embodiment.

DETAILED DESCRIPTION

FIG. 1 illustrates a first example of a multi-spool gas turbine engine 10 of a type preferably provided for use in subsonic flight, and generally comprising an engine core having a turbomachinery with multiple spools which perform compression to pressurize atmospheric air received through an air inlet 13, and which extract energy from combustion gases before they exit the engine via an exhaust outlet 17. The engine core further comprises a core gaspath 11 to direct gases from the air inlet 13 to the exhaust outlet 17, as depicted by the flow arrows in FIG. 1. The core gaspath 11 may be annular and concentric relative to the engine centerline CL.

The term "spool" is herein intended to broadly refer to drivingly connected turbine and compressor rotors and is, thus, not limited to a compressor and turbine assembly on a single shaft. As will be seen hereinafter, it also includes a rotary assembly with multiple shafts geared together.

In the embodiment shown in FIG. 1, the engine core includes a low pressure (LP) spool 12 and a high pressure (HP) spool 14. The LP spool 12 generally comprises an LP compressor 12a for pressurizing air received from the air inlet 13 and an LP turbine 12b for extracting energy from combustion gases discharged from a combustor 15 in which compressed air is mixed with fuel and ignited for generating an annular stream of hot combustion gases. The LP turbine 12b may be connected mechanically to the LP compressor 12a. Flow communication between the two LP compressor 12a and the low pressure turbine 12b is through the high pressure spool 14 and the combustor 15 via the core gaspath 11. According to one aspect of the embodiment shown in FIG. 1, the LP compressor 12a and the LP turbine 12b are coaxially mounted for rotation about a common axis, which may correspond to the engine centerline CL.

The HP spool 14 generally comprises an HP compressor 14a connected in flow communication with the LP compressor 12a for receiving pressurized air therefrom via the core gaspath 11. The HP spool further comprises an HP turbine 14b, which may be located immediately downstream of the combustor 15. The HP turbine 14b is drivingly connected to the HP compressor 14a via an HP shaft 14c. The HP shaft 14c may be coaxial to the engine centerline CL. In the illustrated embodiment, the LP compressor 12a, the LP turbine 12b, the HP turbine 14b and the HP compressor 14a are all mounted for rotation about the engine centerline CL. The HP spool may be drivingly connected to an accessory gearbox (AGB) 28 that may be side mounted and drivingly connected to the HP pressure spool via a tower shaft 29. Alternatively, the AGB 28 may be coaxially mounted at the rear end of the engine 10 for providing drive outputs to various accessories (e.g. fuel pump, starter-generator, oil pump, scavenge pump, etc.). For instance, the HP shaft 14c may be extended axially beyond the HP compressor 14a through a central bore of the LP compressor 12a to provide a drive input to the AGB 28.

The LP turbine 12b is also known as the power turbine. The LP turbine 12b may drive two or more rotatable loads. According to the illustrated embodiment, the first load is a propeller 16, which provides thrust for flight and taxiing in aircraft applications. However, it is understood that the first load could be any suitable component, or any combination of suitable components, that is capable of receiving a rotational drive from the LP turbine 12b. For instance, in an alternate embodiment where the engine 10 is a turboshaft instead of a turboprop as depicted in FIG. 1, the first load could include helicopter main rotor(s) and/or tail rotor(s), pump(s), generator(s), gas compressor(s), marine propeller(s), etc.

In the embodiment shown in FIG. 1, the first load (i.e. the propeller 16) is drivingly coupled to an output shaft 18 extending axially from an output end of a reduction gearbox (RGB) 20. The input end of the RGB 20 is mechanically coupled to a LP turbine shaft 12c drivingly connected to the LP turbine 12b. As shown in FIG. 1, the LP turbine shaft 12c and the output shaft 18 may be coaxial to the engine centerline CL. The RGB 20 processes and outputs the rotational drive transferred thereto from the LP turbine 12b via the LP turbine shaft 12c through known gear reduction techniques. The RGB 20 allows for the propeller 16 to be driven at a rotational speed, which is different from the rotational speed of the LP turbine 12b, which may thereby provide for better efficiency.

Still referring to FIG. 1, the LP turbine 12b may selectively drive the LP compressor 12a. According to one aspect of the illustrated embodiment, the LP compressor 12a may be selectively drivingly connected to the LP turbine 12b via an LP compressor drive shaft 12d. It can be appreciated from FIG. 1 that the LP compressor drive shaft 12d is an external shaft. It will be appreciated that the LP compressor drive shaft 12d may be internal, that is, radially inward of the core gas path 11 and may extend through the engine HP shaft 14c. In the illustrated embodiment, the LP compressor drive shaft 12d is disposed radially outwardly of the engine core and, more particularly, radially outwardly of an outer circumference of the core gaspath 11. In other words, the LP compressor drive shaft 12d is radially offset from the core gas path 11. As illustrated, the external shaft 12d can be parallel to the HP shaft 14c but radially offset with respect thereto. In the illustrated embodiment, the LP compressor drive shaft 12d axially spans the HP spool 14, which includes the HP turbine 14b, the HP compressor 14a, and the HP pressure shaft 14c, and is connected at an input end to the LP turbine shaft 12c by a first mechanical link 30 and at an output end thereof to the LP compressor 12a via a second mechanical link 32. The LP compressor drive shaft 12d may axially overlap the core gas path 11.

As schematically depicted in dotted lines in FIG. 1, the first and second mechanical links 30, 32 could be provided at various axially spaced-apart locations relative to the LP turbine 12b and the LP compressor 12a. For instance, the first mechanical link 30 is shown next to the RGB 20 downstream of the LP turbine 12b relative to the gas flowing through the core gaspath 11. The second mechanical link 32 is shown adjacent to the AGB 28 on an upstream side of the LP compressor 12a. The LP compressor 12a could be provided with a shaft extension 12a' projecting axially from the upstream side of the LP compressor rotor for connection with the mechanical link 32. Alternatively, the first and second mechanical links 30, 32 could be respectively located closer to the LP turbine 12b and the LP compressor 12a and even be located on an upstream side of the LP turbine 12b and the downstream side of the LP compressor 12a, respectively. These alternative mechanical locations could be used to reduce the length of the LP compressor drive shaft 12d or to accommodate different mechanical constraints.

The mechanical links 30, 32 may be provided in the form gear sets, thereby allowing changing the mechanical speed between each segment. The LP turbine 12b and the LP compressor 12a could, thus, have different speeds to optimize performance or accommodate mechanical constraints. Also, the gears could be configured so that the LP compressor rotational direction (clockwise or counter-clockwise) is opposite to that of the HP compressor 14a. On another version, the configuration could set to have the LP turbine 12b rotating in the opposite direction of the HP turbine 14b. This could allow reducing the flow turning losses in transition between the turbomachinery components.

Each mechanical link 30, 32 could further comprise a tower shaft or the like to allow positioning of the external LP compressor shaft 12d further away from the engine centerline CL. Also, it is understood that any suitable type of mechanical link adapted to transfer a torque from the LP turbine 12b to the LP compressor 12a could be used (i.e. the mechanical links are not limited to gear sets and the like).

By positioning the LP compressor drive shaft 12d outside of the engine core as described herein above, the disconnection of the LP compressor drive shaft 12d may be facilitated when it is desired or required to perform engine inspection or maintenance operations on the hot engine section of the engine 10. With the external LP compressor shaft 12d, one could simply disconnect the shaft 12d from one of its mechanical links 30, 32 and split the engine 10 through a plane between the LP turbine 12b and the HP turbine 14b. The proposed external shaft architecture may allow to preserve the ability of splitting the engine 10 in the turbine section while accommodating a compressor boost in a compact axially in-line turbomachinery arrangement.

The engine 10 shown in FIG. 1 is a "reverse-flow" engine 10 because gases flow through the core gaspath 11 from the air inlet 13 at a rear portion of the engine, to the exhaust outlet 17 at a front portion thereof. This is in contrast to a "through-flow" gas turbine engine (FIG. 2) in which gases flow through the core gaspath 11 of the engine from a front portion to a rear portion. The direction of the flow of gases through the core gaspath 11 of the engine 10 disclosed herein can be better appreciated by considering that the gases flow through the core gaspath 11 in the same direction D as the one along which the engine 10 travels during flight. Stated differently, gases flow through the engine 10 from a rear end thereof towards the propeller 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

In view of the foregoing, it can also be appreciated that the LP compressor 12a is disposed aft of the LP turbine 12b. Likewise, the HP compressor 14a is disposed aft of the HP turbine 14b. The LP and HP turbines 12b, 14b are disposed immediately adjacent to one another with no concentric HP and LP shafts extending therebetween. The use of an external LP compressor drive shaft 12d eliminates the need for a concentric shaft arrangement to interconnect LP spool components disposed on axially opposite ends of the HP spool. This may allow for the provision of an engine split plane between the LP and HP turbines 12b, 14b. Such a modular approach facilitates engine disassembly and, thus, access to the engine internal components for inspection purposes and the like.

In operation, the LP compressor 12a pressurizes the air received from air inlet 13. The air is then directed from the LP compressor 12a to the HP compressor 14a via the core gaspath 11, which is annular in the illustrated embodiment. The HP compressor 14a further pressurized the air before the compressed air is mixed with fuel and ignited in the combustor 15. The combustion gases discharged from the combustor 15 flow through the various stages of the HP turbine 14b where energy is extracted to drive the HP compressor 14a and the AGB 28. The combustion gases flow through the core gaspath 11 from the HP turbine 14b to the LP turbine 12b where further energy is extracted from the combustion gases by the LP turbine 12b to drive the LP compressor 12a and the RGB 20 and the propeller 16. The combustion gases are then discharged from the engine 10 via exhaust 17.

It can be appreciated that during operation of the engine 10, the LP compressor 12a driven by the LP turbine 12b feeds pressurized air to the HP compressor 14a. Therefore, the pressurized air flow produced by the LP compressor 12a is provided to the HP compressor 14a and contributes to the work of both the LP turbine 12b and the HP turbine 14b.

It can thus be appreciated that the presence of the above-described LP and HP spools 12, 14 provides the engine 10 with a "split compressor" arrangement. More particularly, some of the work required to compress the incoming air is transferred from the HP compressor 14a to the LP compressor 12a. In other words, some of the turbine work allocated to compression is transferred from the HP turbine 14b to the LP turbine 12b. This transfer of work may contribute to higher pressure ratios while maintaining a relatively small number of rotors. In a particular embodiment, higher pressure ratios allow for higher power to weight ratio, better engine specific fuel consumption (SFC), and a lower combustor exit temperature (sometimes referred to as "T4") for a given power. These factors can contribute to a lower overall weight for the engine 10. The transfer of compression work from the HP compressor 14a to the LP compressor 12a contrasts with some conventional reverse-flow engines, in which the high pressure compressor (and thus the high pressure turbine) perform all of the compression work.

It can thus be appreciated that at least some of the embodiments of the engine 10 disclosed herein provide a mechanical architecture of turbomachinery that allows for a split compressor system and easy disassembly of the engine between the LP turbine 12b and the HP turbine 14b. Such a split compressor engine arrangement with an externally disposed LP compressor shaft 12d may be used for aircraft nose installations, as well as for wing installations. It can also be used for industrial applications. This engine architecture also allows for a geared LP compressor which may be advantageous from an aerodynamic/thermodynamic point of view. Performance gains might also result from a leaner mechanical arrangement, i.e. less parasitic losses associated to support bearings and transfer gears.

In some cases, it may be desired to drivingly disengage the LP compressor 12a from the LP turbine 12b. In some cases, it may be desired to drivingly engage the LP compressor 12a to the HP compressor 14a. In some cases, it may be desired to allow free rotation of the LP compressor 12a by drivingly disengaging it from both of the LP turbine 12b and the HP compressor 14a. The engine 10 is operable in a first configuration in which the LP compressor 12a is drivingly disconnected from both of the LP turbine 12b and the HP compressor 12b; in a second configuration in which the LP compressor 12a is drivingly connected to the HP compressor 14a and drivingly disconnected from the LP turbine 12b; in a third configuration in which the LP compressor 12a is drivingly connected to the LP turbine 12b and drivingly disconnected from the HP compressor 14a; and in a fourth configuration in which the LP compressor 12a is drivingly connected to both of the HP compressor 14a and to the LP turbine 12b. Operating the engine 10 in the fourth configuration, also referred to as a single-spool configuration, may allow to operate the engine 10 as a single spool engine since all of the rotating components, that is the LP compressor 12a, the HP compressor 14a, the HP turbine 14b and the LP turbine 12b, rotate at substantially the same rotational speed. In both of the first and second configurations, the LP turbine 12b is a free power turbine and may drive solely the rotatable load (e.g., propeller 16). In other words, in both of the first and second configurations, the engine 10 is operated in a free power turbine mode. In the third configuration, the engine 10 is operated in a boosted mode. In the embodiment shown, the low-pressure turbine 12b is drivingly connected to the output shaft 18 of the engine 10 in all of the first, second, third, and fourth configurations.

In the embodiment shown, the engine 10 includes a clutch system CS. The clutch system CS may include two clutches, namely a first clutch 40 and a second clutch 42. Both of the first and second clutches 40, 42 may be any suitable type of clutches known in the art. It is understood that configurations of the engine 10 using only either one of the two clutches 40, 42 are contemplated.

In the depicted embodiment, the first clutch 40 is located on the LP compressor drive shaft 12d and the second clutch 42 is located axially between the LP and HP compressors 12a, 14a relative to the engine center line CL. The first clutch 40 is operable in an engaged configuration in which the LP compressor 12a is drivingly connected to the LP turbine 12b via the LP compressor drive shaft 12d and a disengaged configuration in which the LP compressor 12a is drivingly disconnected from the LP turbine 12b. The second clutch 42 is operable in an engaged configuration in which the LP compressor 12a is drivingly connected to the HP compressor 14a via the HP shaft 14c and in a disengaged configuration in which the LP compressor 12a is drivingly disconnected from the HP compressor 14a. It will be appreciated that, in the embodiment shown, both of the first and second clutches 40, 42 may be simultaneously in the engaged configurations. Both of the first and second clutches 40, 42 may be simultaneously in the disengaged configurations.

The engine 10 may be in the first configuration by having both the first and second clutches 40, 42 in their disengaged configurations. The engine 10 may be in the second configuration by having the first clutch 40 in the disengaged configuration and by having the second clutch 42 in the engaged configuration. The engine 10 may be in the third configuration by having the first clutch 40 in the engaged configuration and by having the second clutch 42 in the disengaged configuration. The engine 10 may be in the fourth configuration by having both of the first and second clutches 40, 42 in their engaged configurations.

Stated differently, the engine 10 may have two clutches 40, 42. The first clutch 40 is operable to link the LP compressor 12a to the LP drive shaft 12d and the second clutch 42 is operable to link the LP compressor 12a to the HP shaft 14c. The intended modes of operations are for either clutch systems 40, 42 to be engaged exclusively, or no clutch engaged. If the first clutch 40 is engaged, that is to couple the LP turbine 12b with LP compressor 12a, a boosted engine type may be achieved. If the second clutch 42 is engaged, that is to couple the LP compressor 12a to the HP compressor 14a, or if none of the clutch systems 40, 42 are engaged, a free power turbine engine may be achieved. In other words, the free power turbine configuration is achieved by having the first clutch 40 in the disengaged configuration.

Disengaging the first clutch 40 to decouple the LP compressor 12a from the LP turbine 12b may benefit in low output power conditions such as ground idle/taxi mode where the LP drive shaft 12d runs at low rotational speeds or may be non-rotating. Disengaging the first clutch 40 and with the second clutch 42 in the engaged configuration may allow to have the LP compressor 12a running faster than if the second clutch 42 were in the disengaged configuration. Having the second clutch 42 in the engaged configuration and the first clutch 40 in the disengaged configuration may help to maintain a higher pressure ratio engine at low output power, which may be desirable for the environmental control system (ECS) bleed system. Higher compressor work may mean higher temperature drop across the HP turbine 12b, which may result in lower temperature at the entry of the LP turbine 12b, which may in turn result in higher durability.

In flight idle mode, it may be desirable in some circumstances for an aircraft equipped with the engine 10 to be operated such as to keep the propeller 16 running at 100% speed. However, if the engine is operated in the boosted engine mode, the LP shaft 12d may have a fixed rotational speed that may increase the risks of compressor stability and operability. Using the option to transfer the LP compressor 12a mechanical link from the LP shaft 12d to the HP shaft 14c, which may have a variable, self-adjusting, rotational speed, may reduce these risks. In other words, these risks may be alleviated by having the LP compressor 12a drivingly disconnected from the LP turbine 12b and drivingly connected to the HP compressor 14a.

Having the ability to drivingly engage together the LP and HP compressors 12a, 14a may allow the engine to have the capability to change the number of compressor stages drivingly connected to the HP turbine 14b. The arrangement of the two clutches 40, 42 may allow the engine to switch from a free power turbine to a boosted configuration.

It is understood that the engine 10 may include only the first clutch 40 to selectively engage or disengage the LP compressor 12a to the LP turbine 12b. Alternatively, the engine 10 may include only the second clutch 42 to selectively engage or disengage the LP compressor 12a to the HP compressor 14a.

Referring now to FIG. 2, a gas turbine engine in a through-flow configuration is generally shown at 100. A through-flow configuration corresponds to an engine in which the gas flow through the core gaspath 11 via inlet 130 from a front end 100a of the engine 100 to a rear end 100b thereof. Herein, "front" and "rear" are used in reference to a flying direction of the engine 100, which is depicted by arrow D. The airflow direction through the engine 100 is depicted by arrow A. The combustion gases are discharged from the engine 100 via exhaust 170, which is located at the rear end 100b. For the sake of conciseness, only elements that differ from the engine 10 described above with reference to FIG. 1 are described herein below.

In the embodiment shown, the engine 100 includes a low-pressure shaft 120d and a high-pressure shaft 14c. Herein, both of the low-pressure shaft 120d and the high-pressure shaft 14c are located radially inwardly of the core gas path 11 relative to the engine center line CL of the engine 100. In the embodiment shown, the low- and high-pressure shafts 120d, 14c are concentric. The high-pressure shaft 120d may be located radially inwardly of the high pressure shaft 14c relative to the center line CL. It will be appreciated that the through-flow configuration 100 may embodied an external shaft such as the shaft 12d described above with reference to FIG. 1.

In the present embodiment, the clutch system CS has two clutches, namely a first clutch 140 and a second clutch 142. As shown in FIG. 2, both of the first and second clutches 140, 142 are located axially between the LP compressor 12a and the HP compressor 14a relative to the center line CL. The first clutch 140 is located forward of the second clutch 142. Other configurations are however contemplated.

The first clutch 140 is operable in an engaged configuration in which the LP turbine 12b is in driving engagement with the LP compressor 12a via the LP shaft 120d and in a disengaged configuration in which the LP compressor 12a is drivingly disconnected from the HP pressure turbine 12b. The second clutch 142 is operable in an engaged configuration in which the LP compressor 12a is in driving engagement with the HP compressor 14a via the HP shaft 14c and in a disengaged configuration in which the LP compressor 12a is drivingly disconnected from the HP compressor 14a.

It is understood that both of the engines 10, 100 of FIGS. 1-2 may be operated as shown in said figures, that is, by having the propeller 16 forward of a remainder of the engine relative to the direction of travel depicted by arrow D. Alternatively, both of the engines 10, 100 of FIGS. 1-2 may be operated in a "pusher" configuration in which the propeller 16 is located aft of a remainder of the engines 10, 100 relative to the direction of travel D. This may be achieved by rotating the engines 10, 100 by 180 degrees thereby making the engine 10 of FIG. 1 a through-flow engine and making the engine 100 of FIG. 2 a reverse-flow engine. It is understood that such flip over of the engine would require some modifications.

The disclosed engines 10, 100 are able to be operated both in boosted and un-boosted configurations. As explained herein above, the boosted configuration corresponds to a configuration in which the LP turbine 12b drivingly engages the LP compressor 12a and the un-boosted configuration corresponds to a configuration in which the LP turbine is free. The disclosed engines 10, 100 are able to allow a variable work-split between the stages of the compressor section of the engine by selectively coupling or decoupling the LP and HP compressors 12a, 14a.

For operating the engine, a power request is received; the gas turbine engine 10, 100 is set in a free-turbine configuration by disengaging the low-pressure compressor 12a from the low-pressure turbine 12b if the power request is below a power threshold while keeping the low-pressure turbine 12b drivingly connected to the output shaft 18; and the gas turbine engine 10, 100 is set in a boosted configuration by engaging the low-pressure compressor 12a to the low-pressure turbine 12b if the power request is below a power threshold while keeping the low-pressure turbine 12b drivingly connected to the output shaft 18. The setting of the engines 10, 100 in the free-turbine and boosted configurations may be done based on the power request and a rotational speed of the propeller.

In some cases, the low-pressure compressor 12a is engaged to the high-pressure compressor 14a if the power request is below the power threshold while keeping the low-pressure turbine 12b drivingly connected to the output shaft 18. This can be done based on the power request and the rotational speed of the propeller. In the disclosed embodiment, drivingly engaging the low-pressure compressor 12a to the high-pressure compressor 14a include setting the second clutch 42 in the engaged configuration, the second clutch 42 operatively connected to the high-pressure shaft 14c drivingly engaging the high-pressure compressor 14a to the high-pressure turbine 14b. In the embodiment shown, setting the gas turbine engine 10, 100 in the free-turbine configuration includes setting the first clutch 40 in a disengaged configuration in which the low-pressure turbine 12b is drivingly disconnected from the low-pressure compressor 12a. In the embodiment shown, setting the gas turbine engine 10, 100 in the boosted configuration includes setting the first clutch 40 in an engaged configuration in which the low-pressure turbine 12b is drivingly connected to the low-pressure compressor 12a.

Embodiments Disclosed Herein Include:

A. A gas turbine engine comprising: an engine core having, in serial flow communication, a low-pressure compressor, a high-pressure compressor, a high-pressure turbine drivingly connected to the high-pressure compressor, and a low-pressure turbine drivingly connected to an output shaft; and a clutch having a disengaged configuration in which the low-pressure turbine is drivingly disconnected from the low-pressure compressor such that, in the disengaged configuration, the clutch disengages the low-pressure turbine from the low-pressure compressor, and an engaged configuration in which the low-pressure turbine is drivingly connected to the low-pressure compressor, the low-pressure turbine drivingly connected to the output shaft in both of the engaged and disengaged configurations of the clutch.

B. A gas turbine engine comprising: an engine core having, in serial flow communication, a low-pressure compressor, a high-pressure compressor, a high-pressure turbine drivingly connected the high-pressure compressor, and a low-pressure turbine drivingly connected to an output shaft; a system for selectively engaging the low-pressure compressor to one or both of the high-pressure compressor and the low-pressure turbine.

Embodiments A and B may include any of the following elements, in any combinations:

Element 1: a second clutch having a second engaged configuration in which the low-pressure compressor is drivingly connected to the high-pressure compressor and in a second disengaged configuration in which the high-pressure compressor is drivingly disconnected from the low-pressure compressor. Element 2: the gas turbine engine is operable in a single-spool configuration in which the low-pressure turbine is drivingly connected to the low-pressure compressor via the clutch being in the engaged configuration and in which the low-pressure compressor is drivingly connected to the high-pressure compressor via the second clutch being in the second engaged configuration. Element 3: having a low-pressure shaft for drivingly engaging the low-pressure compressor to the low-pressure turbine, the clutch operatively connected to the low-pressure shaft. Element 4: the low-pressure shaft is radially offset from a core gas path of the engine core relative to a center line of the gas turbine engine. Element 5: the gas turbine engine is a reverse-flow gas turbine engine. Element 6: the low-pressure shaft is concentric with a high-pressure shaft, the high-pressure shaft drivingly connecting the high-pressure compressor to the high-pressure turbine. Element 7: a low-pressure shaft for drivingly engaging the low-pressure compressor to the low-pressure turbine, the clutch operatively connected to the low-pressure shaft and wherein the high-pressure compressor is in driving engagement with a high-pressure shaft, the second clutch operatively connected to the high-pressure shaft. Element 8: the system includes a first clutch operable to selectively engage the low-pressure compressor to the low-pressure turbine and a second clutch operable to selectively engage the low-pressure compressor to the high-pressure compressor. Element 9: the first clutch and the second clutch are simultaneously operable in engaged configurations for engaging the low-pressure compressor to both of the low-pressure turbine and the high-pressure compressor. Element 10: the low-pressure compressor is selectively drivingly connected to the low-pressure turbine via a low-pressure shaft, the first clutch operatively connected to the low-pressure shaft and wherein the high-pressure compressor is in driving engagement with a high-pressure shaft, the second clutch operatively connected to the high-pressure shaft. Element 11: the low-pressure shaft is radially offset from a core gas path of the engine core relative to a center line of the gas turbine engine. Element 12: the low-pressure shaft is concentric with the high-pressure shaft. Element 13: the gas turbine engine is a turboshaft or turboprop reverse-flow engine.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A gas turbine engine comprising:
an engine core having, in serial flow communication, a low-pressure compressor, a high-pressure compressor, a high-pressure turbine drivingly connected to the high-pressure compressor, and a low-pressure turbine drivingly connected to an output shaft;
a first clutch having a disengaged configuration in which the low-pressure turbine is drivingly disconnected from the low-pressure compressor such that, in the disengaged configuration, the first clutch disengages the low-pressure turbine from the low-pressure compressor, and an engaged configuration in which the low-pressure turbine is drivingly connected to the low-pressure compressor, the low-pressure turbine drivingly connected to the output shaft in both of the engaged configuration and the disengaged configuration of the first clutch;
a second clutch having a second engaged configuration in which the low-pressure compressor is drivingly connected to the high-pressure compressor and a second disengaged configuration in which the high-pressure compressor is drivingly disconnected from the low-pressure compressor; and
an accessory gearbox drivingly engaged to the high-pressure turbine in both of the disengaged configuration and the engaged configuration of the first clutch.

2. The gas turbine engine of claim 1, wherein the gas turbine engine is operable in a single-spool configuration in which the low-pressure turbine is drivingly connected to the low-pressure compressor via the first clutch being in the engaged configuration and in which the low-pressure compressor is drivingly connected to the high-pressure compressor via the second clutch being in the second engaged configuration.

3. The gas turbine engine of claim 1, having a low-pressure shaft for drivingly engaging the low-pressure compressor to the low-pressure turbine, the first clutch operatively connected to the low-pressure shaft.

4. The gas turbine engine of claim 3, wherein the low-pressure shaft is radially offset outwardly from a core gas path of the engine core relative to a center line of the gas turbine engine.

5. The gas turbine engine of claim 4, wherein the gas turbine engine is a reverse-flow gas turbine engine.

6. The gas turbine engine of claim 3, wherein the low-pressure shaft is concentric with a high-pressure shaft, the high-pressure shaft drivingly connecting the high-pressure compressor to the high-pressure turbine.

7. The gas turbine engine of claim 1, having a low-pressure shaft for drivingly engaging the low-pressure compressor to the low-pressure turbine, the first clutch operatively connected to the low-pressure shaft and wherein the high-pressure compressor is in driving engagement with a high-pressure shaft, the second clutch operatively connected to the high-pressure shaft.

8. A gas turbine engine comprising:
an engine core having, in serial flow communication, a low-pressure compressor, a high-pressure compressor, a high-pressure turbine drivingly connected the high-pressure compressor, and a low-pressure turbine drivingly connected to an output shaft;
a system for selectively engaging the low-pressure compressor to one or both of the high-pressure compressor and the low-pressure turbine; and
an accessory gearbox drivingly engaged to the high-pressure turbine when the low-pressure compressor is engaged to the high-pressure compressor and when the low-pressure compressor is engaged to the low-pressure turbine,
wherein the system comprises:
a first clutch operable to selectively engage the low-pressure compressor to the low-pressure turbine, and
a second clutch operable to selectively engage the low-pressure compressor to the high-pressure compressor.

9. The gas turbine engine of claim 8, wherein the first clutch and the second clutch are simultaneously operable in engaged configurations for engaging the low-pressure compressor to both of the low-pressure turbine and the high-pressure compressor.

10. The gas turbine engine of claim 8, wherein the low-pressure compressor is selectively drivingly connected to the low-pressure turbine via a low-pressure shaft, the first clutch operatively connected to the low-pressure shaft and wherein the high-pressure compressor is in driving engagement with a high-pressure shaft, the second clutch operatively connected to the high-pressure shaft.

11. The gas turbine engine of claim 10, wherein the low-pressure shaft is radially outwardly offset from a core gas path of the engine core relative to a center line of the gas turbine engine.

12. The gas turbine engine of claim 10, wherein the low-pressure shaft is concentric with the high-pressure shaft.

13. The gas turbine engine of claim 8, wherein the gas turbine engine is a turboshaft or turboprop reverse-flow engine.

* * * * *